United States Patent
Debat et al.

(10) Patent No.: US 6,821,063 B2
(45) Date of Patent: Nov. 23, 2004

(54) TOOL, A MACHINE, AND A METHOD FOR ORBITALLY DRILLING AN ORIFICE

(75) Inventors: Claude Debat, Brax (FR); Michel Bureller, Antony (FR)

(73) Assignee: Recoules S.A., Ozoir la Ferriere (FR)

( * ) Notice: Subject to any disclaimer, the term of this patent is extended or adjusted under 35 U.S.C. 154(b) by 0 days.

(21) Appl. No.: 10/291,669

(22) Filed: Nov. 12, 2002

(65) Prior Publication Data

US 2003/0102139 A1 Jun. 5, 2003

(30) Foreign Application Priority Data

Nov. 13, 2001 (FR) .............................. 01 14675

(51) Int. Cl.⁷ .............................. B23B 1/00; B23B 41/00
(52) U.S. Cl. ........................ 409/132; 409/191; 409/192; 409/143; 409/137
(58) Field of Search ................................. 409/143, 191, 409/700, 65, 66, 74, 132, 137

(56) References Cited

U.S. PATENT DOCUMENTS

| | | | | |
|---|---|---|---|---|
| 3,584,534 A | * | 6/1971 | Hougen | ...................... 409/191 |
| 4,223,577 A | * | 9/1980 | Seppelt | ........................ 408/57 |
| 4,813,828 A | | 3/1989 | Beck et al. | |
| 6,007,281 A | * | 12/1999 | Eriksson et al. | ............. 409/132 |
| 6,081,980 A | * | 7/2000 | Lunn | .......................... 409/192 |
| 6,382,890 B1 | * | 5/2002 | Linderholm | ................. 409/191 |
| 6,533,508 B1 | * | 3/2003 | Nonaka | ....................... 409/132 |

FOREIGN PATENT DOCUMENTS

| | | | | |
|---|---|---|---|---|
| DE | 939 063 | | 2/1956 | |
| DE | 4228322 A1 | * | 3/1994 | ........... B23B/51/08 |
| DE | 298 16 665 | | 12/1998 | |
| GB | 1 349 060 | | 3/1974 | |
| SU | 85461 | * | 1/1979 | ................ 409/143 |
| WO | 00 21705 | | 4/2000 | |
| WO | 01 15870 | | 3/2001 | |

* cited by examiner

Primary Examiner—A. L. Wellington
Assistant Examiner—Dana Ross
(74) Attorney, Agent, or Firm—Young & Thompson

(57) ABSTRACT

The tool comprises firstly a cutter support for being driven in rotation about a first axis of rotation that is to coincide with the axis of the orifice, and a cutter rotatably mounted on the cutter support to rotate about a second axis of rotation parallel to the first axis of rotation and spaced apart therefrom by a non-zero offset distance. A front segment of the cutter support has maximum radial extent relative to the first axis of rotation that is less than or equal to the radius of the orifice to enable the front segment to penetrate into the orifice during drilling. The tool is particularly applicable to drilling machines used in the aviation industry.

10 Claims, 3 Drawing Sheets

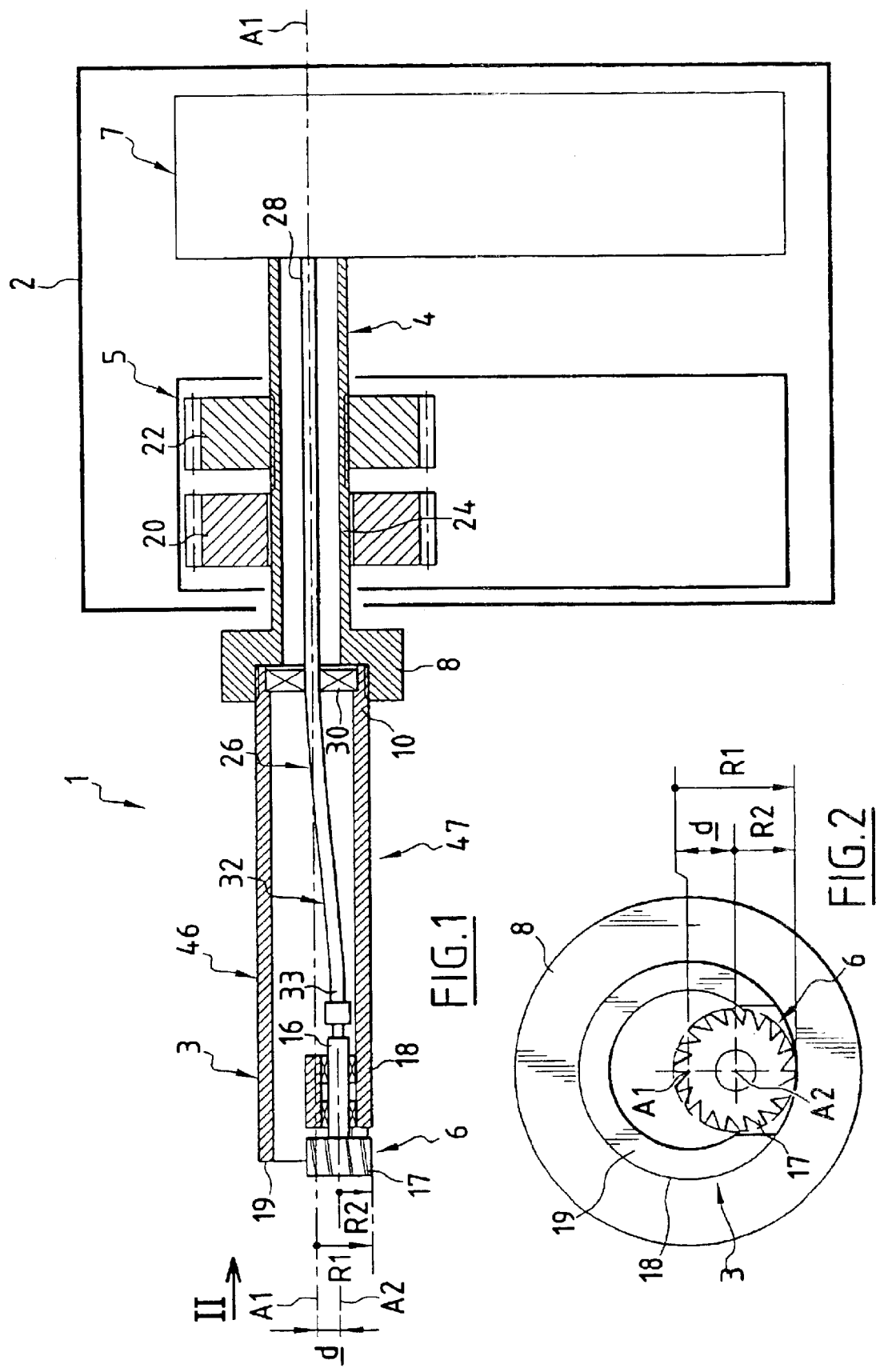

TOOL, A MACHINE, AND A METHOD FOR ORBITALLY DRILLING AN ORIFICE

The present invention relates to a tool for drilling an orifice, the tool being of the type comprising:
- a cutter support designed to be rotated about a first axis of rotation that is to coincide with the axis of the orifice; and
- a cutter rotatably mounted on the cutter support and having a central axis forming a second axis of rotation parallel to the first axis of rotation and spaced apart therefrom by a non-zero offset, the cutter being designed to be rotated about the second axis of rotation relative to the cutter support in order to drill the orifice.

The invention applies in particular to drilling tools used in the aviation industry.

BACKGROUND OF THE INVENTION

A tool of the above-specified type makes use of an "orbital" drilling method, where "orbital" refers to the motion of the cutter about the first axis of rotation.

Compared with a conventional tool in which the cutting head is a drill bit on the axis of the orifice to be drilled, such an orbital tool makes it possible to reduce both the rotary driving torque needed for the cutting head and also the axial penetration force needed for enabling the cutting head to penetrate into the workpiece being drilled.

Nevertheless, in a tool of the above-specified type, the cutter extends generally axially from outside the workpiece to be drilled into the inside of the orifice. Furthermore, the radial extent of the cutter support relative to the first axis of rotation is greater than the radius of the orifice drilled in the workpiece. While drilling is taking place, the cutter is thus cantilevered out and is subjected to high bending forces which can harm, in particular, the shape and the precision of the orifices that are obtained.

Thus, tools of the above-specified type are poorly adapted to making orifices having a large length/diameter ratio.

OBJECTS AND SUMMARY OF THE INVENTION

An object of the invention is to solve that problem by providing a tool of the above-specified type which makes it possible to make orifices having a large length/diameter ratio.

To this end, the invention provides a tool of the above-specified type, wherein at least a front segment of the cutter support has a maximum radial extent relative to the first axis of rotation that is less than or equal to the radius of the orifice so as to enable the front segment of the cutter support to penetrate into the orifice during drilling.

In particular embodiments of the invention, the tool may comprise one or more of the following characteristics taken singly or in any technically feasible combination:
- the maximum radial extent of the front segment of the cutter support is substantially equal to the radius of the orifice so that the front segment of the cutter support possesses at least one bearing surface for bearing against the wall of the orifice to guide the cutter during drilling;
- bearing surface of the cutter support has an outline that is circular or in the form of an arc of a circle centered on the first axis of rotation and with a radius that is substantially equal to the radius of the orifice;
- the cutter support comprises a tube;
- the tool includes swarf-removal means for removing swarf formed by the cutter;
- the swarf-removal means comprise an opening passing radially through the tube;
- the tool includes an intermediate member for transmitting rotary motion to the cutter, and at least one segment of the intermediate member is both centered on the first axis of rotation and rotatable about the first axis of rotation; and
- the cutter support is centered on the first axis of rotation.

The invention also provides a machine for drilling an orifice, the machine comprising:
- a drilling tool as defined above; and
- motorized drive means for driving the cutter support in rotation about the first axis of rotation and for driving the cutter in rotation about the second axis of rotation.

In a variant, the machine includes a spindle on which the cutter support is removably mounted, the spindle being rotatable about the first axis of rotation by the drive means.

The invention also provides a method of drilling an orifice in a workpiece, the method comprising the steps of:
- driving the cutter support of a drilling tool as defined above in rotation about a first axis of rotation;
- driving the cutter in rotation about the second axis of rotation;
- pressing the cutter axially forward against the part in order to drill the orifice therein; and
- causing at least the front segment of the cutter support to penetrate into the orifice as it is being drilled.

BRIEF DESCRIPTION OF THE DRAWINGS

The invention will be better understood on reading the following description given purely by way of example and made with reference to the accompanying drawings, in which:

FIG. 1 is a diagrammatic partially-cutaway side view of a machine constituting a first embodiment of the invention;

FIG. 2 is an end view of the cutter and the cutter support of the FIG. 1 machine seen looking along arrow II;

MORE DETAILED DESCRIPTION

Figure 3:
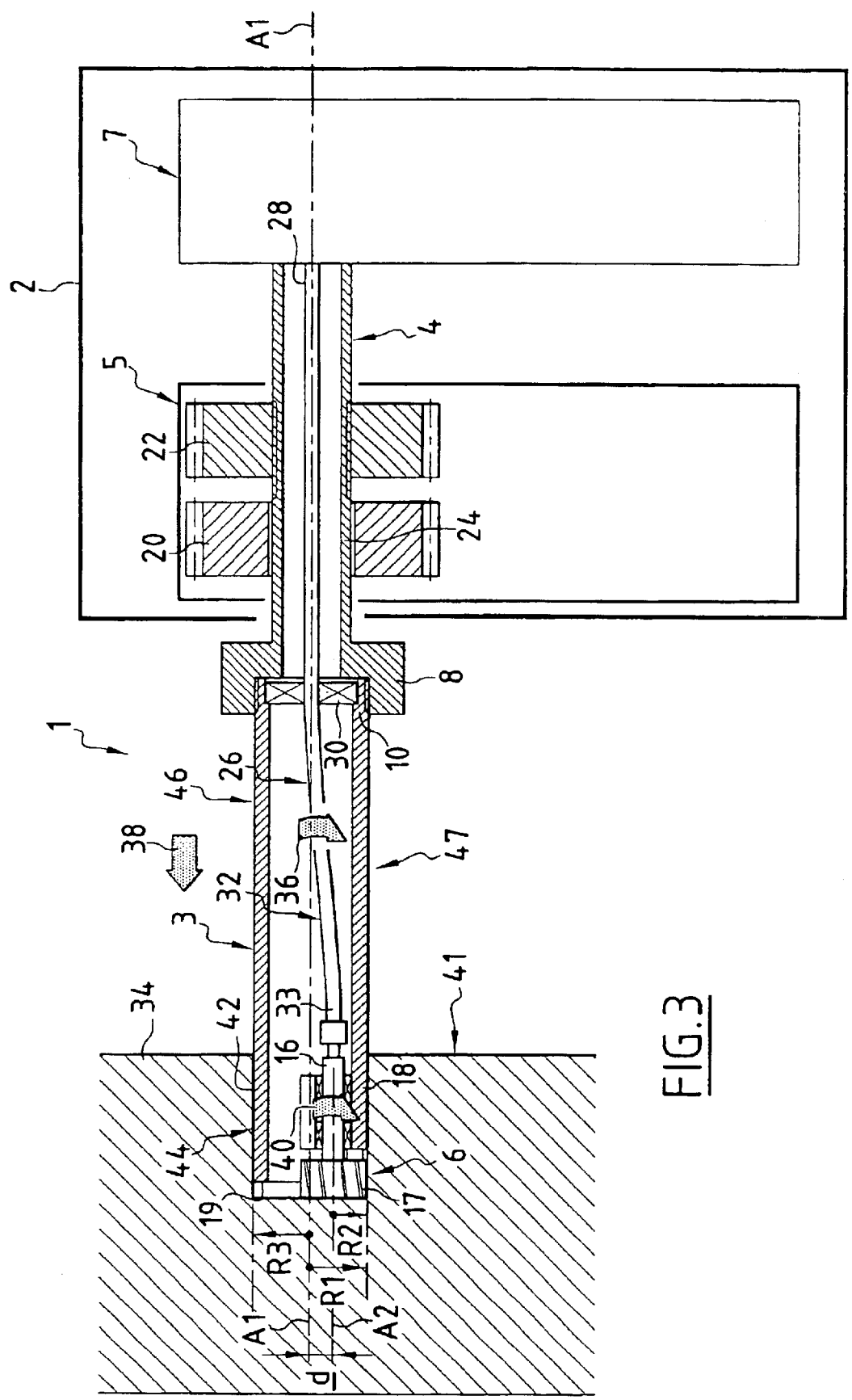
FIG. 3 is a view analogous to FIG. 1 showing a part being drilled by the machine of FIGS. 1 and 2.

Below, the terms "front" and "rear" are used relative to the direction in which an orifice is drilled in a workpiece, i.e. from the outside towards the inside of the orifice.

FIG. 1 is a diagram showing a drilling machine 1 for implementing an orbital drilling method.

The machine 1 mainly comprises:
- a casing 2;
- a cutter support 3 removably mounted on a spindle 4;
- means 5 for driving the support 3, these means being housed in the casing 2;
- a cutter 6 mounted on the support 3; and
- means 7 for driving the cutter 6, these means being housed inside the casing 2.

The support 3 and the spindle 4 extend along a first axis A1 constituting a common central axis. The spindle 4 projects out from the casing 2 via a front or distal end 8, with the remainder of the spindle being received inside the casing 2.

The support 3 has its rear or proximal end 10 mounted at the front or distal end 8 of the spindle 4. The support 3 thus extends the spindle 4 in a forward direction.

By way of example, the support 3 can be mounted on the spindle 4 by screwing the rear end 10 into the front end 8, possibly with the help of an auxiliary part.

The support 3 comprises a circular section tube centered on the first axis A1 and of outside radius R1, as shown in FIGS. 1 and 2.

The cutter 6 has a rear mounting shank 16 and an active front portion 17 carrying teeth.

The cutter 6 is mounted by means of its rear shank 16 to the free front end 18 of the support 3 firstly so as to be capable of turning about the central axis A2 of the cutter 6 relative to the support 3, and secondly so as to be constrained to move axially in translation with the support 3. It should be observed that the cutter 6 is releasably mounted to the support 3 so as to enable the cutter 6 to be replaced.

The active portion 17 of the cutter 6 projects axially beyond the front edge 19 of the support 3.

The central axis A2 of the cutter 6 is parallel to the axis A1 and is radially spaced apart therefrom by a spacing distance or offset d that is not zero.

As shown more particularly in FIG. 2, in its active portion 17, the cutter 6 possesses a cutting outside radius R2 about the axis A2 such that:

$$R1 \approx d+R2$$

In fact, R1 is very slightly less than d+R2 so as to leave clearance of the sliding fit type, e.g. a few microns or a few tens of microns so as to make operation as described below possible.

R1 is thus considerably greater than R2.

The drive means 5 comprise a motor (not shown), e.g. a pneumatic motor, together with a gear train connecting said motor to the spindle 4, with only two gearwheels 20 and 22 of the gear train being shown in FIG. 1.

The gear train forms a conventional "positive feed" mechanism for the drill. This mechanism serves both:

to drive the spindle 4 and thus the support 3 together with the cutter 6 in axial translation relative to the casing 2 in the forward and rearward directions; and to drive the spindle 4 and thus the support 3 together with the cutter 6 in rotation relative to the casing 2 about the first axis of rotation A1.

In conventional manner, these movements are obtained by rotating the gearwheels 20 and 22 at different speeds, the gearwheel 20 being constrained to rotate with the spindle 4 while being movable in translation along the axis A1 relative thereto, and the gearwheel 22 being screwed onto a threaded intermediate segment 24 of the spindle 4.

The shank 16 of the cutter 6 is connected to the drive means 7 via a rod 26.

A rear segment 28 of the rod 26 extends from the means 7 inside the spindle 4 to a ball bearing 30 disposed at the rear end 10 of the support 3.

This rear segment 28 is substantially rectilinear and centered on the axis A1. The remaining segment 32 of the rod 26 extends inside the support 3. This front segment 32 flexes radially outwards as far as the axis A2 so that its front end 33 is connected to the rear shank 16 of the cutter 6. The front end 33 and the shank 16 of the cutter 6 are constrained to rotate together about the axis A2.

The drive means 7 comprise a motor, e.g. a pneumatic motor, and a gear train connecting it to the rear end of the rod 26 in order to rotate the rod 26 along its director line which, in the rear segment 28, coincides with the first axis of rotation A1, and for the front end 33 of the front segment 32 with the axis of rotation A2.

Thus, the drive means 7 need only produce rotary motion coaxial with that of the spindle 4 in order to rotate the cutter 6 about its own central axis A2.

The drive means 7 are connected to the rear end of the spindle 4 so as to accompany it in its axial translation movement relative to the casing 2.

As shown in FIG. 3, in order to drill an orifice in workpiece 34, the drive means 5 and 7 are set into operation so as to cause:

the support 3 to rotate about the axis A1 as represented by arrow 36, while simultaneously advancing axially as represented by arrow 38; and the cutter 6 to rotate about its own central axis A1 as represented by arrow 40.

The active portion 17 of the cutter 6 is thus pressed axially forwards against workpiece 34. The axes A1 and A2 are substantially orthogonal to the outside surface 41 of the part 42 through which drilling is initiated.

The cutter 6 thus removes swarf tangentially from workpiece 34 so as to drill an orifice 42 therein about the axis A1 and of radius R3 equal to the sum d+R2. This bore is thus cylindrical and of constant section along the axis A1.

As drilling continues, as shown in FIG. 3, the front end 18 of the support 3 penetrates progressively into the orifice 42 and bears radially against the side wall 44 of the orifice 42. This penetration and this bearing are made possible by the fact that the radii R1 and R3 are equal, ignoring the necessary clearance as mentioned above.

Thus, the outside surface 46 of the support 3 forms a bearing surface against the wall 44 of the orifice 42, thereby enabling the support 3 to guide and center the cutter 6 in the orifice 42. This guidance makes it possible to achieve satisfactory precision for drilling the orifice 42.

Once the orifice 42 has been drilled, the cutter 6 and the support 3 are reversed axially so as to withdraw them from the orifice 42.

Since the support 3 is adapted to penetrate into the orifice 42 while it is being drilled, the length of the cutter 6 is shorter than in conventional machines that implement an orbital drilling method. Thus, the cutter 6 is less liable to be deflected and the machine 1 makes it possible to drill orifices having a large length/diameter ratio.

It should be observed that in order to achieve this result, the support 3 need not necessarily act as a guide for the cutter 6 in the orifice 42. Thus, the outside radius R1 of the support 3 can be considerably smaller than the radius R3 of the orifice 42.

It should also be observed that the support 3 need not necessarily be a body of revolution about the axis A1. Thus, the support 3 may have a plurality of bearing surfaces 46 for engaging the wall 44 of the orifice 42, for example three bearing surfaces occupying circular arcs centered on the axis A1 and of radius R1.

It should also be observed that the structure of the drive means 5 and 7 can be particularly simple and low cost since:

the cutter 6 is mounted to rotate relative to the support 3 which therefore does not need to be rotated about the axis A2; and the drive means 5 and 7 are required only to produce rotary motion about the same axis without any offset, with this being made possible by the rod 26 which acts as an intermediate transmission member.

Nevertheless, this characteristic is not essential for ensuring that the drive means 5 and 7 are simple and low in cost.

Thus, in a variant that is not shown, the drive means 7 may comprise a motor that is not housed inside the casing 2, but that is provided at the front end 18 of the support 3 and that is powered, e.g. pneumatically, by a power line replacing the rod 26.

In another variant, the drive means 5 do not cause the cutter 6 to advance, with this movement being obtained by moving the entire machine 1 forwards, e.g. by an operator if the machine is portable, i.e. if it weighs less than 15 kilograms (kg).

In any event, the above principles are applicable to machines whether or not they are portable.

Finally, it should be observed that the cutter 6 and the support 3 form a drilling tool 47 which can be removably mounted at the front end of the tool-carrying spindle 4 of a drilling machine that is already in existence. The drilling tool 47 can thus be sold separately.

Figure 4:
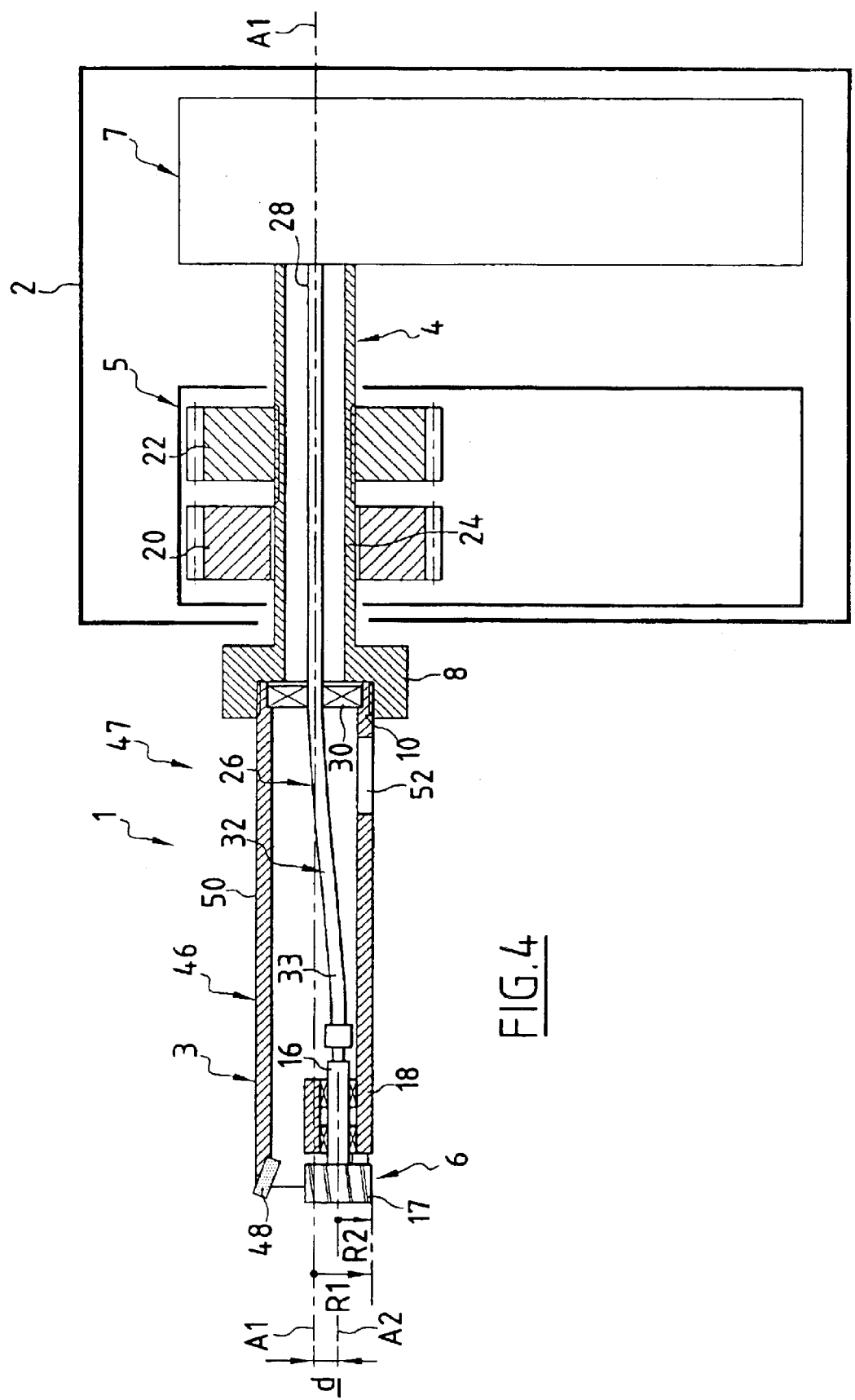
FIG. 4 is a view analogous to FIG. 1 showing a variant of the FIG. 1 machine.

FIG. 4 shows a variant of the FIG. 1 machine which differs therefrom as follows.

The front end 18 of the support 3 is provided with a chisel 48 for finishing the orifice 42. By way of example, this chisel 48 is fitted to the front edge 19 of the support 3 diametrically opposite the cutter 6 about the axis A1. In addition, the support 3 has a lateral opening 52 for removing swarf. This opening 52 is provided at the rear end 10 of the support 3.

Because of the presence of the chisel 48 for finishing off the machining produced by the cutter 6, the sum d+R2 is less than R1 by a distance of 0.1 millimeters (mm) to 0.2 mm so as to ensure that the radius R1 remains substantially equal to R3 and thus that the radially outside surface 46 of the support 3 comes to bear against the wall 44 of the orifice 42.

In this case also, the front end 18 of the support 3 penetrates into the orifice 42 while drilling is taking place, thus making it possible to drill orifices 42 having a large length/diameter ratio.

In addition, suction means may be connected to the opening 52 for removing the swarf that is produced during drilling.

Removing swarf via the inside of the support 3 limits the extent to which the wall 44 of the orifice 42 being drilled is damaged by rubbing against swarf.

What is claimed is:

1. A tool for drilling an orifice in a workpiece, the tool comprising:

a cutter support designed to be rotated about a first axis of rotation that is to coincide with an axis of the orifice, the cutter support comprising a tube;

a cutter rotatably mounted at a front end of the cutter support to drill the orifice by pressing the cutter axially frontward against the workpiece, a central axis of the cutter forming a second axis of rotation parallel to the first axis of rotation and spaced apart therefrom by a non-zero offset, the cutter being designed to be rotated about the second axis of rotation relative to the cutter support in order to drill the orifice;

wherein at least the front end of the cutter support has a maximum radial extent relative to the first axis of rotation that is less than or equal to a radius of the orifice so as to enable the front end to follow the cutter into the orifice during drilling; and swarf-removal means for removing swarf formed by the cutter, the swarf-removal means comprising an opening passing radially through the tube.

2. A tool according to claim 1, wherein the maximum radial extent is substantially equal to the radius of the orifice so that the front end possesses at least one bearing surface for bearing against the wall of the orifice to guide the cutter during drilling.

3. A tool according to claim 2, wherein the bearing surface of the cutter support has an outline that is circular or in the form of an arc of a circle centered on the first axis of rotation and with a radius that is substantially equal to the radius of the orifice.

4. A tool according to claim 1, including an intermediate member for transmitting rotary motion to the cutter, and wherein at least one segment of the intermediate member is both centered on the first axis of rotation and rotatable about the first axis of rotation.

5. A tool according to claim 1, wherein the cutter support is centered on the first axis of rotation.

6. A machine for drilling an orifice, the machine comprising:

a drilling tool according to claim 1; and motorized drive means for driving the cutter support in rotation about the first axis of rotation and for driving the cutter in rotation about the second axis of rotation.

7. A machine according to claim 6, including a spindle on which the cutter support is removably mounted, the spindle being rotatable about the first axis of rotation by the drive means.

8. A method of drilling an orifice in a workpiece, the method comprising the steps of:

driving the cutter support of a drilling tool according to claim 1 in rotation about the first axis of rotation;

driving the cutter in rotation about the second axis of rotation;

pressing the cutter axially frontward against the workpiece in order to drill the orifice therein; and causing at least the front end of the cutter support to penetrate into the orifice as it is being drilled.

9. A method according to claim 11, including the step of guiding the cutter in the orifice by pressing the cutter support radially against the wall of the orifice as the orifice is being drilled.

10. A tool for drilling an orifice in a workpiece, comprising:

a cutter support rotatable about a first axis of rotation, a front edge of said cutter support being defined as an edge of said cutter support that faces a surface of a workpiece into which an orifice is to be drilled; and a cutter mounted at said front edge of said cutter support and being rotatable about a second axis of rotation that is parallel to and spaced from the first axis of rotation by a non-zero distance, said cutter having a front edge with a cutting surface that extends frontward beyond said front edge of said cutter support and that drills the orifice as the tool is advanced frontward into the workpiece, said cutter having a maximum radial extent relative to the first axis of rotation that is at least as large as a maximum radial extent of said cutter support relative to the first axis of rotation so that said cutter support follows said cutter into an orifice drilled by said cutter, wherein said cutting surface of said cutter extends rearward on a periphery of said cutter, wherein said cutter support is a rotatable cylinder with a notch in said front edge of said cutting support, and wherein said cutting surface also extends into said notch rearward of said front edge of said cutting support.

* * * * *